United States Patent [19]
Satoh

[11] Patent Number: 6,101,332
[45] Date of Patent: Aug. 8, 2000

[54] CAMERA WITH A BLUR WARNING FUNCTION

[75] Inventor: Tatsuya Satoh, Hachioji, Japan

[73] Assignee: Olympus Optical Co., Ltd., Tokyo, Japan

[21] Appl. No.: 09/257,700

[22] Filed: Feb. 25, 1999

[30]   Foreign Application Priority Data

Mar. 2, 1998  [JP]  Japan ................................ 10-049365

[51] Int. Cl.⁷ .................................................. G03B 17/00
[52] U.S. Cl. .............................. 396/52; 396/55; 396/287; 396/291
[58] Field of Search ............................... 396/52, 55, 287, 396/291, 292

[56]   References Cited

U.S. PATENT DOCUMENTS

| | | | |
|---|---|---|---|
| 4,077,043 | 2/1978 | Nanba | 396/287 |
| 4,958,184 | 9/1990 | Izumi et al. | 396/292 |
| 4,998,126 | 3/1991 | Kazami | 396/287 |
| 4,999,662 | 3/1991 | Bryant | 396/52 |
| 5,014,083 | 5/1991 | Izumi et al. | 396/292 |
| 5,842,051 | 11/1998 | Kumakura | 396/52 |

FOREIGN PATENT DOCUMENTS 5-313241  11/1993  Japan .

*Primary Examiner*—Russell Adams
*Attorney, Agent, or Firm*—Frishauf, Holtz, Goodman, Langer & Chick, P.C.

[57]   ABSTRACT

The present invention provides a camera with a blur warning function which does not widely vary in feeling of use between film-loading and film-unloading. In this camera, a film loading sensing section senses whether a film is loaded or not, a focal length sensing section senses a focal length of a lens, and a camera shake sensing section senses a camera shake. In response to outputs of the film loading section, the focal length sensing section and the camera shake sensing section, a blur amount of an image formed on a film surface is computed by an image blur computing section. A blur warning section gives a warning of an image blur amount in response to an output of the image blur computing section. The information of the blur warning section is controlled by the image blur computing section in accordance with at least information of the film loading sensing section.

9 Claims, 13 Drawing Sheets

| | 104 | 106 | | |
|---|---|---|---|---|
| FIG. 8A | ○ | ○ | ○ | ○ |
| FIG. 8B | ● | ○ | ○ | ○ |
| FIG. 8C | ● | ● | ○ | ○ |
| FIG. 8D | ● | ● | ● | ○ |
| FIG. 8E | ● | ● | ● | ● |

CAMERA WITH A BLUR WARNING FUNCTION

BACKGROUND OF THE INVENTION

The present invention relates to a camera with a blur warning function for sensing a camera shake using a shake sensor and giving a warning of an image blur in response to an output of the shake sensor.

Cameras with a function of sensing a camera shake and giving a warning thereof have recently been developed. In such a camera, when no film is loaded, ISO sensitivity is automatically set to a predetermined one, such as ISO 3200. This prevents both long-period exposure due to an idle shutter and undesirable exhaustion of a battery.

According to the above prior art technique, however, when no film is loaded into a camera, the ISO sensitivity is set high and thus the exposure time is easily shortened. In this state, the warning or display operation of a blur image level according to the exposure time as well as camera shake information is hard to be carried out. Because of no warning or display, a user is likely to think that the camera is troubled or malfunctions.

BRIEF SUMMARY OF THE INVENTION

It is accordingly an object of the present invention to provide a camera with a blur warning function which does not widely vary in feeling of use between film-loading and film-unloading.

A camera with a blur warning function according to a first aspect of the present invention, comprises:

a film loading sensing section for sensing whether a film is loaded or not;

a camera shake sensing section for sensing a camera shake;

an image blur computing section for computing a blur amount of an image formed on an image forming surface in response to an output of the camera shake sensing section; and a blur warning section for giving a warning of a blur in accordance with a computation result of the image blur computing section, wherein the image blur computing section changes the computation result in accordance with a detection result of the film loading sensing section.

A camera with a blur warning function according to a second aspect of the present invention, comprises:

a film loading sensing section for sensing whether a film is loaded or not;

a camera shake sensing section for sensing a camera shake;

a blur computing coefficient determination section for determining a predetermined blur computing coefficient in accordance with a detection result of the film loading sensing section;

an image blur computing section for computing a blur amount of an image formed on an image forming surface in response to an output of the camera shake sensing section and the blur computing coefficient; and a blur warning section for giving a warning of a blur in accordance with a computation result of the image blur computing section.

A camera with a blur warning function according to a third aspect of the present invention, comprises:

a film loading sensing section for sensing whether a film is loaded or not;

a camera shake sensing section for sensing a camera shake;

an image blur computing exposure time determination section for determining computing exposure time information in accordance with a detection result of the film loading sensing section;

an image blur computing section for computing a blur amount of an image formed on an image forming surface in response to an output of the camera shake sensing section and the computing exposure time information; and a blur warning section for giving a warning of a blur in accordance with a computation result of the image blur computing section.

A camera with a blur warning function according to a fourth aspect of the present invention, comprises:

a flash emitting section capable of emitting a flash;

an exposure condition determination section for determining whether a flash is emitted or not;

a camera shake sensing section for sensing a camera shake;

an image blur computing exposure time determination section for determining computing exposure time information in response to an output of the exposure condition determination section;

an image blur computing section for computing a blur amount of an image formed on an image forming surface in response to an output of the camera shake sensing section and the computing exposure time information; and a blur warning section for giving a warning of a blur in accordance with a computation result of the image blur computing section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A to 8E are views of a turn-on state of a blur mode display section and an image blur level display section, for explaining examples of the blur level display patterns A to D;

DETAILED DESCRIPTION OF THE INVENTION

Embodiments of the present invention will now be described with reference to the accompanying drawings.

Figure 1:
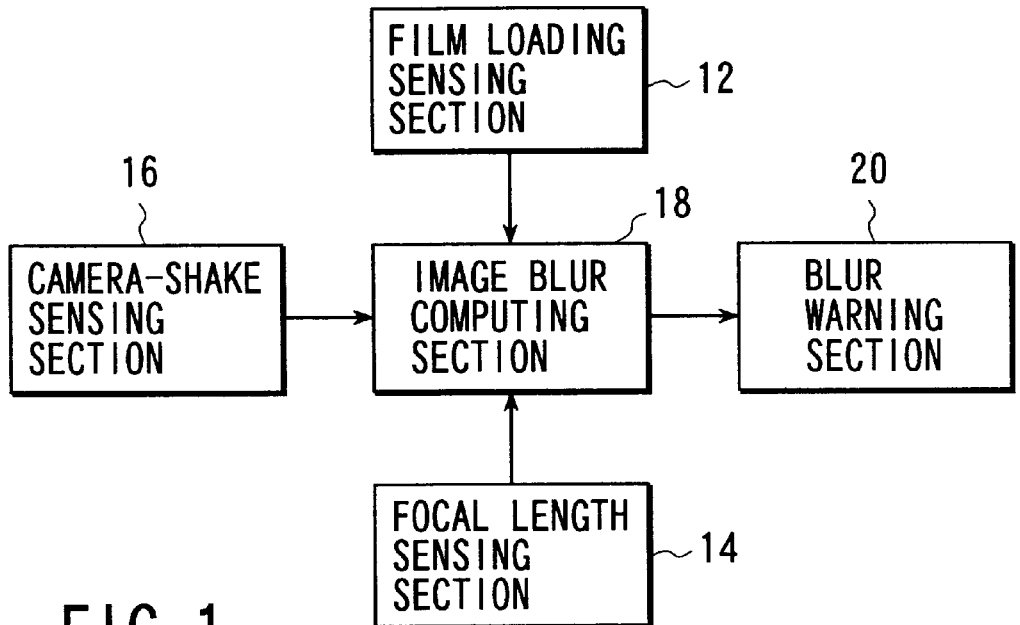
FIG. 1 is a block diagram illustrating the concept of a camera with a blur warning function according to a first embodiment of the present invention.

FIG. 1 is a block diagram illustrating the concept of a camera with a blur warning function according to a first embodiment of the present invention.

In FIG. 1, the camera includes a film loading sensing section 12 for sensing the presence or absence of a film, a focal length sensing section 14 for sensing the focal length of a lens, a camera shake sensing section 16 for sensing a shake of the camera, an image blur computing section 18 for computing an amount of blur in an image formed on a film based on the outputs of the film loading sensing section 12, focal length sensing section 14 and camera shake sensing section 16, and a blur warning section 20 for giving a warning of the amount of blur in response to the output of the image blur computing section 18.

The film loading sensing section 12 is used to sense whether or not a film is loaded into the camera body, and constituted of a DX contact which has been conventionally used in a camera, a film cartridge sensing device which is applied to a camera adaptable to a film having a magnetic recording portion, and the like.

The focal length sensing section 14 is designed to sense the focal length in the present state. The camera shake sensing section 16 includes a known piezoelectric vibrating gyro (angular velocity sensor). The image blur computing section 18 is designed to compute the current image blur state due to a camera shake based on the output of the camera shake sensing section 16, focal length information, and exposure time information.

Usually the image blur state (amount) is computed on the basis of the focal length information, exposure time information and camera shake information, and the relationship among these information items is expressed by the following equation:

amount of image blur=focal length×exposure time×camera shake speed . . . (1)

However, the camera shake speed is fixed within the exposure time.

When a film is loaded into the camera, the exposure time is determined according to the sensitivity of the film and the photometric result of a photometer embedded in the camera. In accordance with the exposure time, an image blur is computed and its state (level) is displayed as a warning based on the computing result.

When no film is loaded into the camera, the ISO speed is generally automatically set to a predetermined one, such as ISO 3200. This prevents both long-period exposure due to an idle shutter (demonstration) and undesirable exhaustion of a battery.

In the film unloading state, the exposure time is easily shortened by setting the ISO speed high. As is evident from the above equation (1), even though the focal length and camera shake speed are both fixed, if the exposure time is short, the amount of blur is decreased. The amount of blur computed when no film is loaded in the camera is smaller than the actual one. A user is therefore likely to think that the blur warning function is fulfilled by mistake.

To resolve the above problem, when the film loading sensing section 12 senses that no film is loaded into the camera, the above equation (1) is changed by adding a coefficient and a constant thereto, thus deleting a difference in feeling with respect to the blur warning function. Even when no film is loaded into the camera, a warning of an image blur state can be provided in such a manner that the camera was used actually.

Figure 2:
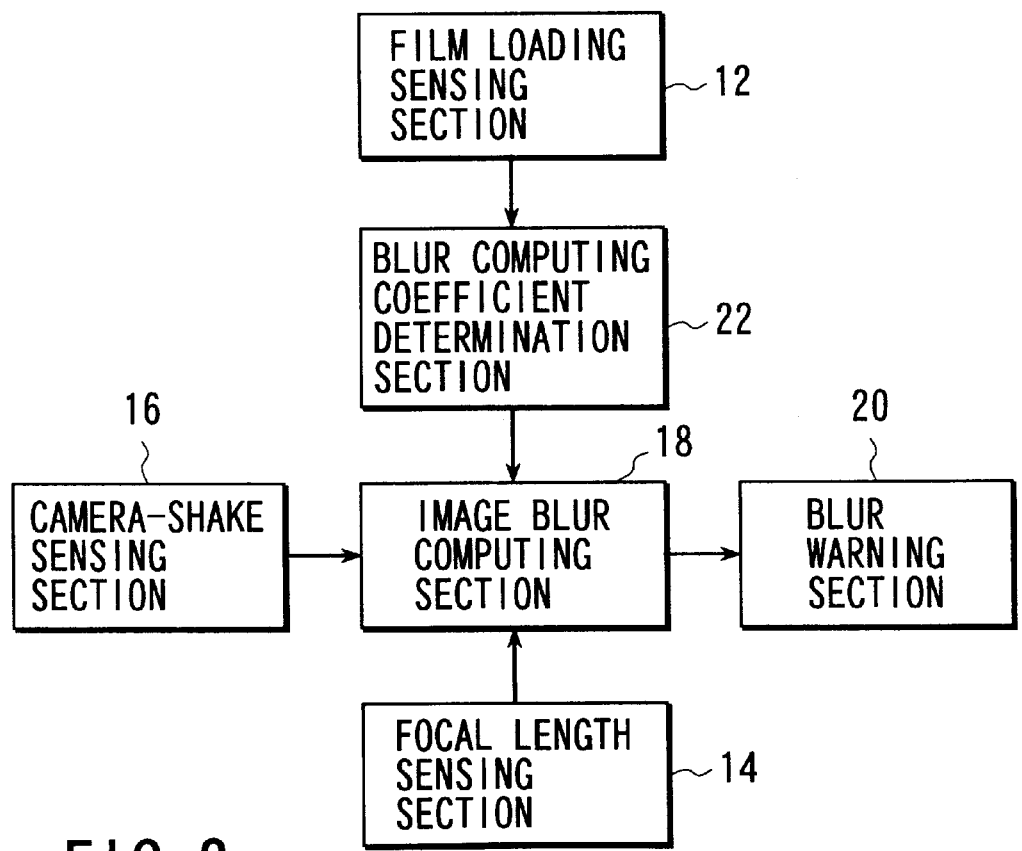
FIG. 2 is a block diagram showing a modification of the camera illustrated in FIG. 1.
Figure 3:
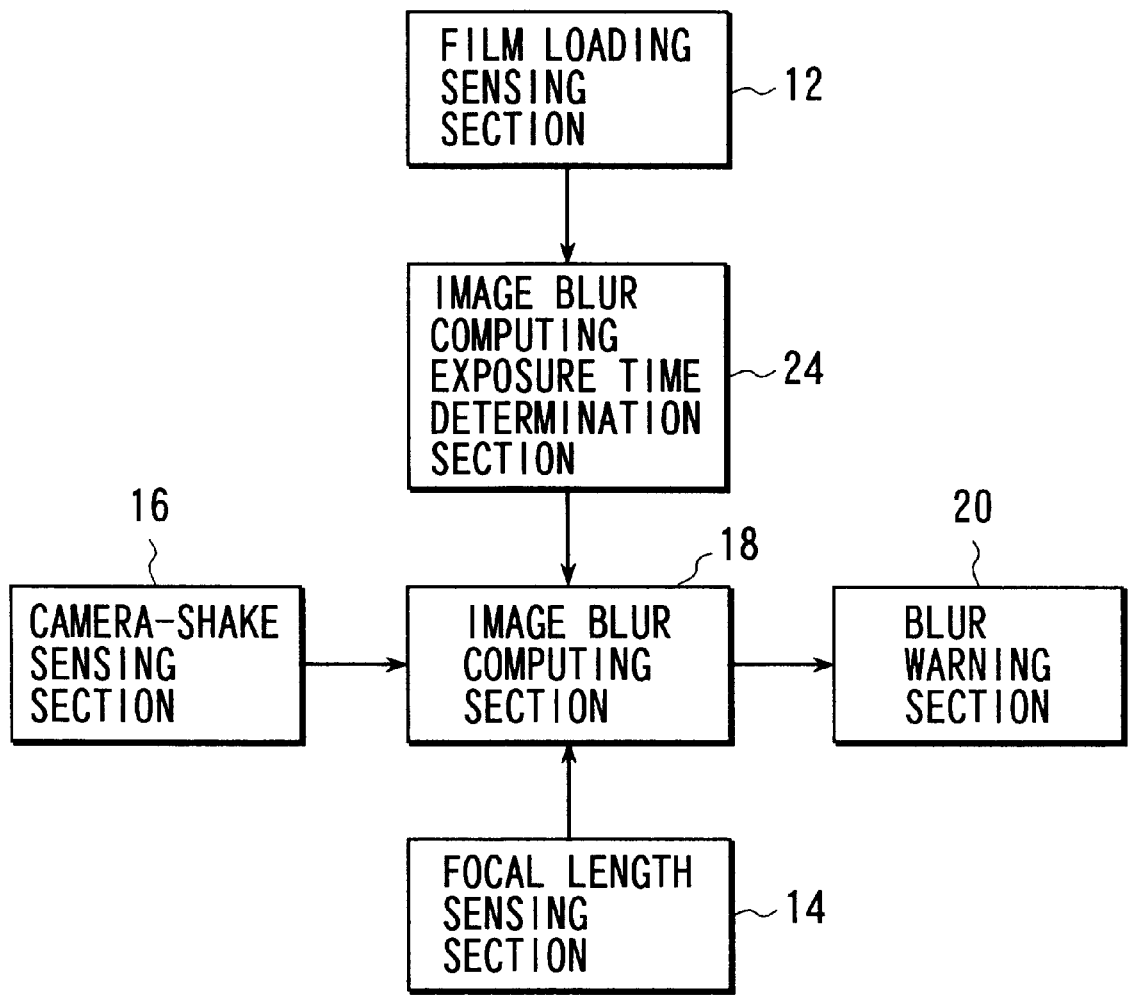
FIG. 3 is a block diagram showing another modification of the camera illustrated in FIG. 1.

FIGS. 2 and 3 illustrate a modification to the camera having the constitution shown in FIG. 1, to which a constituting element for changing the coefficient and constant of the equation (1) is added. The same elements as those of FIG. 1 are indicated by the same reference numerals and their descriptions are omitted.

Referring to FIG. 2, an output of the film loading sensing section 12 is supplied to the image blur computing section 18 through a blur computing coefficient determination section 22. The section 22 is used to determine (change) a coefficient for computing an amount of image blur by the section 18 when the section 12 senses that no film is loaded in the camera. Though an example of a specific operation will be described later, the section 22 sets the coefficient when a film is not loaded larger than that when a film is loaded.

As shown in FIG. 3, an output of the film loading sensing section 12 is supplied to the image blur computing section 18 through an image blur computing exposure time determination section 24. The section 24 is designed to change/set the exposure time of the equation (1) for computing an amount of image blur by the section 18 when the section 12 senses that no film is loaded in the camera. Though an example of a specific operation will be described later, the section 24 sets the exposure time (different from the actual one) for computing an amount of image blur based on the focal length or the relationship between the focal length and the currently-determined exposure time when a film is not loaded.

A second embodiment of the present invention will now be described.

Figure 4:
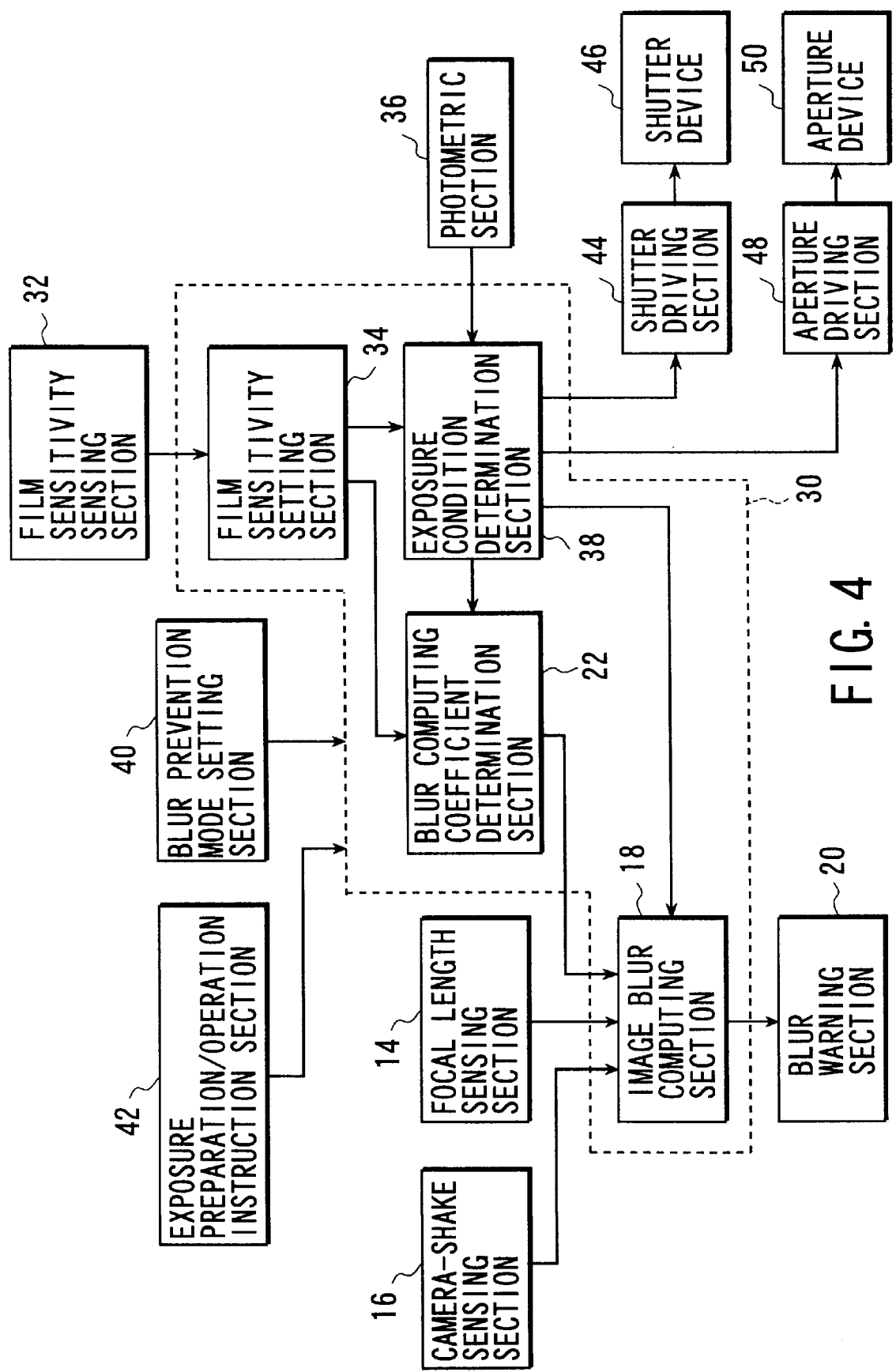
FIG. 4 is a block diagram illustrating the concept of a camera with a blur warning function according to a second embodiment of the present invention.

FIG. 4 is a block diagram illustrating the constitution of a camera with a blur warning function according to the second embodiment of the present invention.

In the second embodiment, the same constituents as those of the first embodiment and its modification are denoted by the same reference numerals, and their descriptions are omitted.

In FIG. 4, a film sensitivity sensing section 32 includes a known DX contact to sense the sensitivity of a film loaded into the camera. The section 32 allows a user to confirm whether a film is loaded into the camera as well as to detect the film sensitivity.

An output of the film sensitivity sensing section 32 is supplied to a film sensitivity setting section 34. When a film is loaded into the camera, the section 34 sets sensitivity information of the film. When no film is loaded, it sets temporary sensitivity information. The output of the section 34 is supplied to a blur computing coefficient determination section 22, and also to an exposure condition determination section 38 together with the photometric result of a photometric section 36. The section 38 determines exposure conditions or exposure time and an aperture value in response to the photometric results of the sections 34 and 36.

The film sensitivity setting section 34, exposure condition determination section 38, blur computing coefficient determination section 22, and image blur computing section 18 constitute a camera control section 30 including a CPU. The camera control section 30 controls the whole of camera.

The camera control section 30 is supplied with both an output of a blur prevention mode setting section 40 for setting a blur prevention mode as a shooting mode of the camera and an output of an exposure preparation/operation instruction section 42 for instructing a user to prepare exposure (first release operation) and start exposure (second release operation). In association with the operations of the section 42, the section 30 starts/stops a display of an image blur state (level).

As the blur prevention mode of the blur prevention mode setting section 40, an image blur state (level) is displayed based on a camera shake and blur prevention measures (not shown) such as a measure for correcting a blur by driving part of a picture-taking optical system and a measure for controlling exposure timing to start an exposure operation with timing of a slight camera shake.

A shutter device 46 is connected to the exposure condition determination section 38 through a shutter driving section 44, while an aperture device 50 is connected thereto through an aperture driving section 48. These devices 46 and 50 are driven in accordance with the exposure conditions determined by the exposure condition determination section 38.

In the foregoing constitution, when the film sensitivity sensing section 32 senses that no film is loaded in the camera, predetermined film sensitivity information such as ISO 3200 is set in the film sensitivity sensing section 34. Then the exposure condition determination section 38 determines exposure time and aperture value in accordance with the ISO information and the photometric result of the photometric section 36.

If the blur prevention mode setting section 40 sets a blur prevention mode as a shooting mode, the camera control section 30 receives it, and the blur computing coefficient determination section 22 sets a coefficient. This coefficient is set larger than that when a film is loaded.

If the exposure preparation/operation instruction section 42 performs an exposure preparation instruction operation (the first release is switched on), the image blur computing section 18 computes an image blur state (level) on the basis of camera shake information sensed by the camera shake sensing section 16, focal length information sensed by the focal length sensing section 14, exposure time information determined by the exposure condition determination section 38, and coefficient determined by the blur computing coefficient determination section 22. In accordance with the result of the computation, the blur warning section 20 displays the image blur state (level). Such a process for alarm warning (display) is executed.

An operation of the major parts of the camera according to the second embodiment will now be described with reference to the flowcharts of FIGS. 5 and 6.

Figure 5:
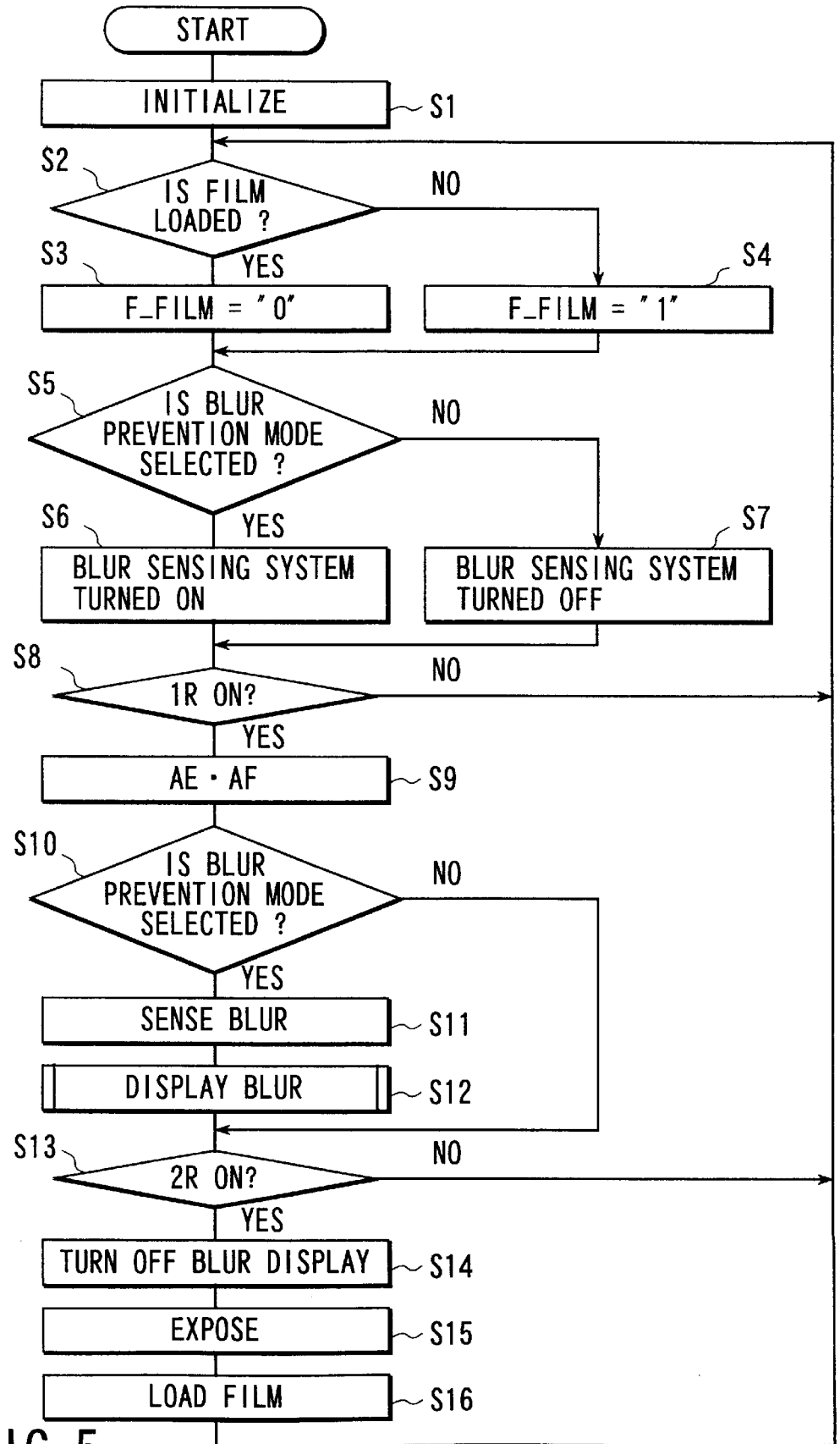
FIG. 5 is a flowchart for explaining the general outline of an operation of the camera shown in FIG. 4.

FIG. 5 is a flowchart for explaining the general outline of the operation of the camera.

First, in step S1, initialization is performed and then, in step S2, it is determined whether a film is loaded into a camera or not. When a film is loaded, the flow advances to step S3, and a film loading state flag F-FILM is set to "0." On the other hand, it is determined in step S2 that no film is loaded, the flow goes to step S4 and the flag F_FILM is set to "1."

In step S5, it is determined whether a blur prevention (warning display) mode is selected or not. If it is selected, the flow advances to step S6 and a blur sensing system is started. If not, the flow moves to step S7 and the blur sensing system is stopped.

In step S8, an exposure preparation instruction operation is carried out and, in other words, it is determined whether the first release (1R) switch is turned on or not. When the 1R switch is on, the flow moves to step S9. When the switch is off, the flow returns to step S2.

In step S9, photometric measurements (AE) and distance measurements (AF) are performed. As a result of the photometric measurements, exposure time is determined. Then, in step S10, it is determined whether the blur prevention (warning display) mode is selected or not. If it is selected, the flow advances to step S11. If not, it moves to step S13.

In step S11, camera shake information output from the camera shake sensing section 16 is taken into the camera control section 30 (sampled). In step S12, the image blur state (level) is displayed or it display mode is changed in accordance with the camera shake information, focal length information and exposure time information. This image blur display operation will be described in detail later.

In step S13, an exposure start instruction operation is carried out and, in other words, it is determined whether the second release (2R) switch is turned on or not. When the 2R switch is on, the flow moves to step S14. When the switch is off, the flow returns to step S2.

In step S14, the display of the image blur state (level) is turned off in response to the exposure start instruction. In step S15, an exposure operation is performed and, in step S16, a film advance operation is carried out. After that, the flow returns to step S2.

An operation of subroutine "BLUR DISPLAY" for computing a blur state (level) will now be described with reference to the flowchart shown in FIG. 6.

First, in step S21, camera shake information A sensed by the camera shake sensing section 16, is read out. In step S22, focal length information B sensed by the focal length sensing section 14, is read out and then, in step S23, exposure time information C determined by the exposure condition determination section 38, is read out.

In step S24, it is determined whether the film loading state flag F_FILM is "1" or not. When it is "1" or when no film is loaded, the flow advances to step S25 and coefficient K is set to "$2^3$." When the film flag F_FILM is "0" or when a film is loaded, the flow goes to step S26 and coefficient K is set to "1."

In the above step S25, the coefficient is not limited to "$2^3$" but can be larger than "1" which is set in step S26.

In step S27, an image blur amount D is computed. This computation is basically executed by the following equation (2):

$$D = A \times B \times C \times K \quad (2)$$

where D is an image blur amount, A is a camera shake speed, B is a focal length, and C is exposure time. The camera shake speed is fixed within the exposure time.

When no film is loaded into the camera, the coefficient K is larger than that set when a film is loaded, but the exposure time C is made shorter than usual by setting the ISO sensitivity high, with the result that no great difference occurs among the computed image blur amounts D. Even though no film is loaded into the camera, the feeling of use of the camera is not so different from usual, and the image blur state can be displayed.

In step S28, it is determined whether the image blur amount D computed in step S27 is smaller or larger than predetermined value "LEV 1." If it is smaller, the flow moves to step S31. If it is larger, the flow advances to step S29.

In step S29, it is determined whether the image blur amount D computed in step S27 is smaller or larger than predetermined value "LEV 2." If it is smaller, the flow moves to step S32. If it is larger, the flow advances to step S30.

In step S30, it is determined whether the image blur amount D computed in step S27 is smaller or larger than predetermined value "LEV 3." If it is smaller, the flow moves to step S33. If it is larger, the flow advances to step S34.

In step S31, a blur level is displayed by display pattern A when it is determined that the image blur amount D is smaller than "LEV 1." In step S32, a blur level is displayed by display pattern B when it is determined that the image blur amount D ranges from "LEV 1" to "LEV 2."

In step S33, a blur level is displayed by display pattern C when it is determined that the image blur amount D ranges from "LEV 2" to "LEV 3." In step S34, a blur level is displayed by display pattern D when it is determined that the image blur amount D is larger than "LEV 3."

After steps S31 to S34, the flow moves to step S35 to perform a blur display operation. The flow then advances to step S13 in FIG. 5.

The above display patterns A to D will be described specifically with reference to FIGS. 7 and 8A to 8E.

Figure 7:
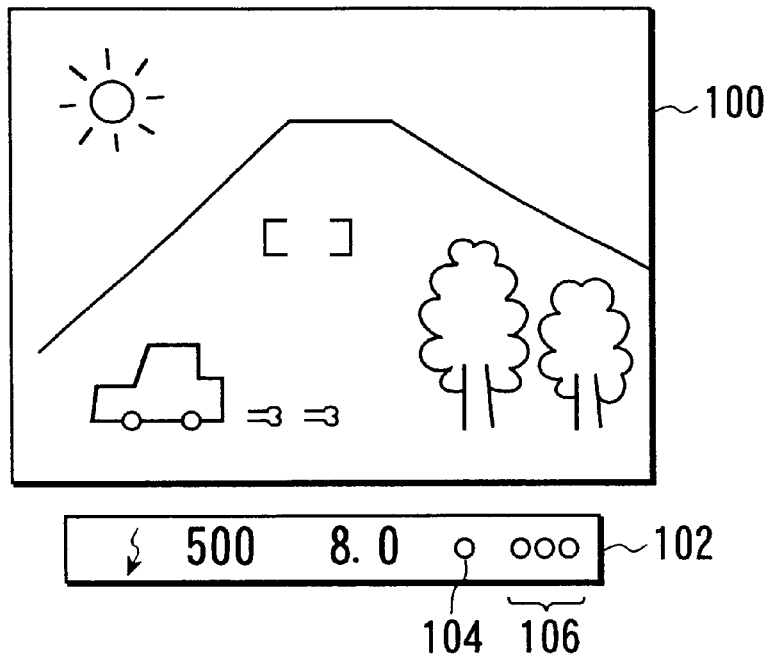
FIG. 7 is an illustration of a display state in a finder, for explaining examples of blur level display patterns A to D.

FIG. 7 is an illustration of a display state in a finder. An in-finder display section 102 is provided under a finder surface 100. The section 102 includes a blur mode display section 104 for displaying that a shooting mode of the camera is a blur prevention (reduction) shooting mode and an image blur level display section 106 for displaying the present blur level state.

FIGS. 8A to 8E are views of a turn-on state of the blur mode display section 104 and image blur level display section 106. These sections 104 and 106 are each constituted of, e.g., an LED.

In FIGS. 8A to 8E, white circles indicate that the sections 104 and 106 are turned off, while black circles represent that they are turned on.

FIG. 8A is an example in which the blur prevention (reduction) mode is not selected as a shooting mode of the camera. In this example, neither the blur mode display section 104 nor the blur level display section 106 is turned on.

FIGS. 8B to 8E are examples in which the blur prevention (reduction) mode is selected as a shooting mode of the camera. In this example, the blur mode display section 104 is turned on as shown.

Figure 6:
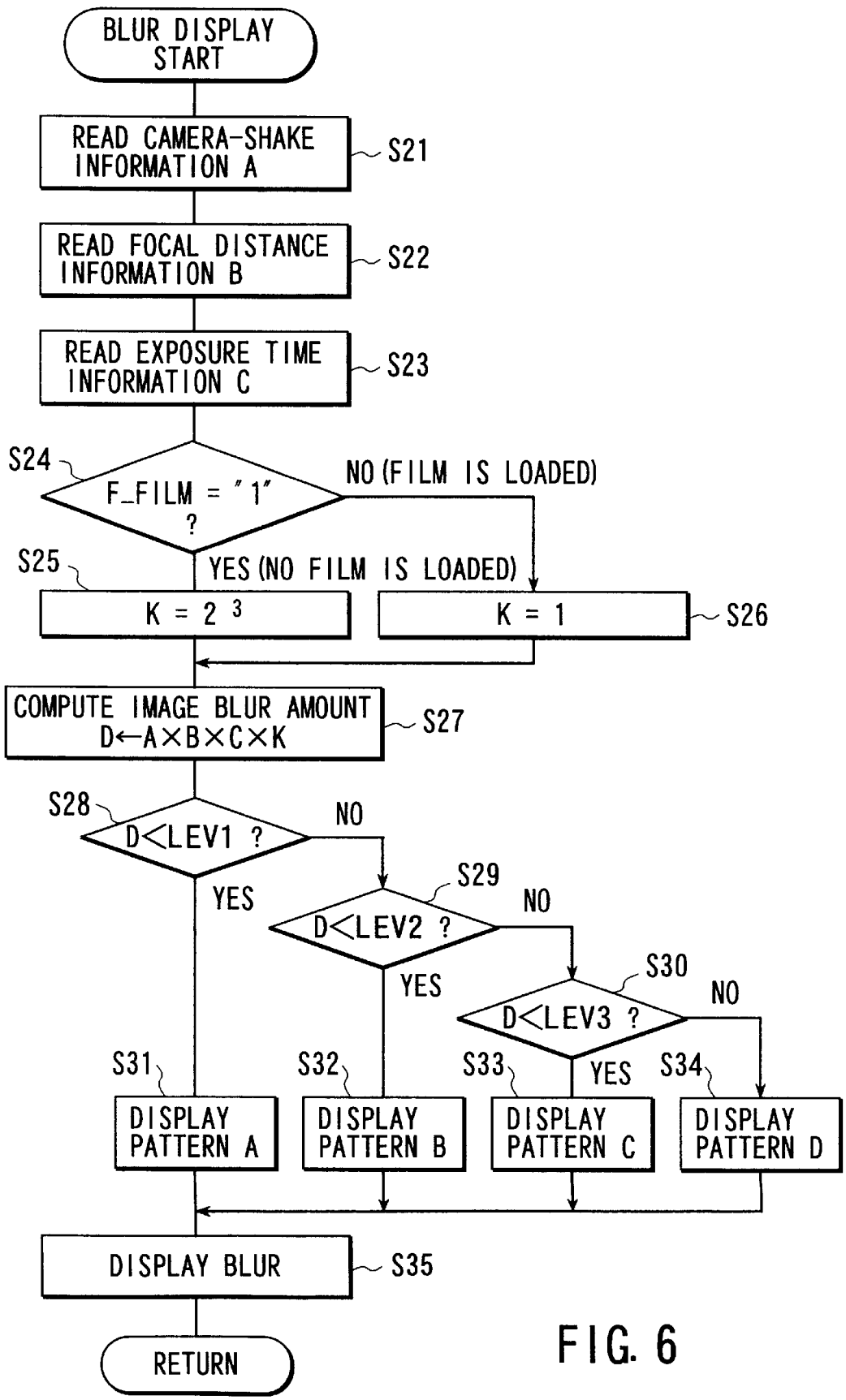
FIG. 6 is a flowchart for explaining an operation of subroutine "BLUR DISPLAY" for computing a blur state (level)

FIGS. 8B, 8C, 8D and 8E correspond to display patterns A, B, C and D of steps S31, S32, S33 and S34 in the flowchart shown in FIG. 6, respectively.

The larger the image blur amount D computed in step S27 of the flowchart in FIG. 6, the larger the number of LEDs turned on by the image blur level display section 106. These displays are changed according to an image blur state whenever the subroutine of "BLUR DISPLAY" in step S12 of the flowchart shown in FIG. 5 is executed.

A third embodiment of the present invention will now be described.

Figure 9:
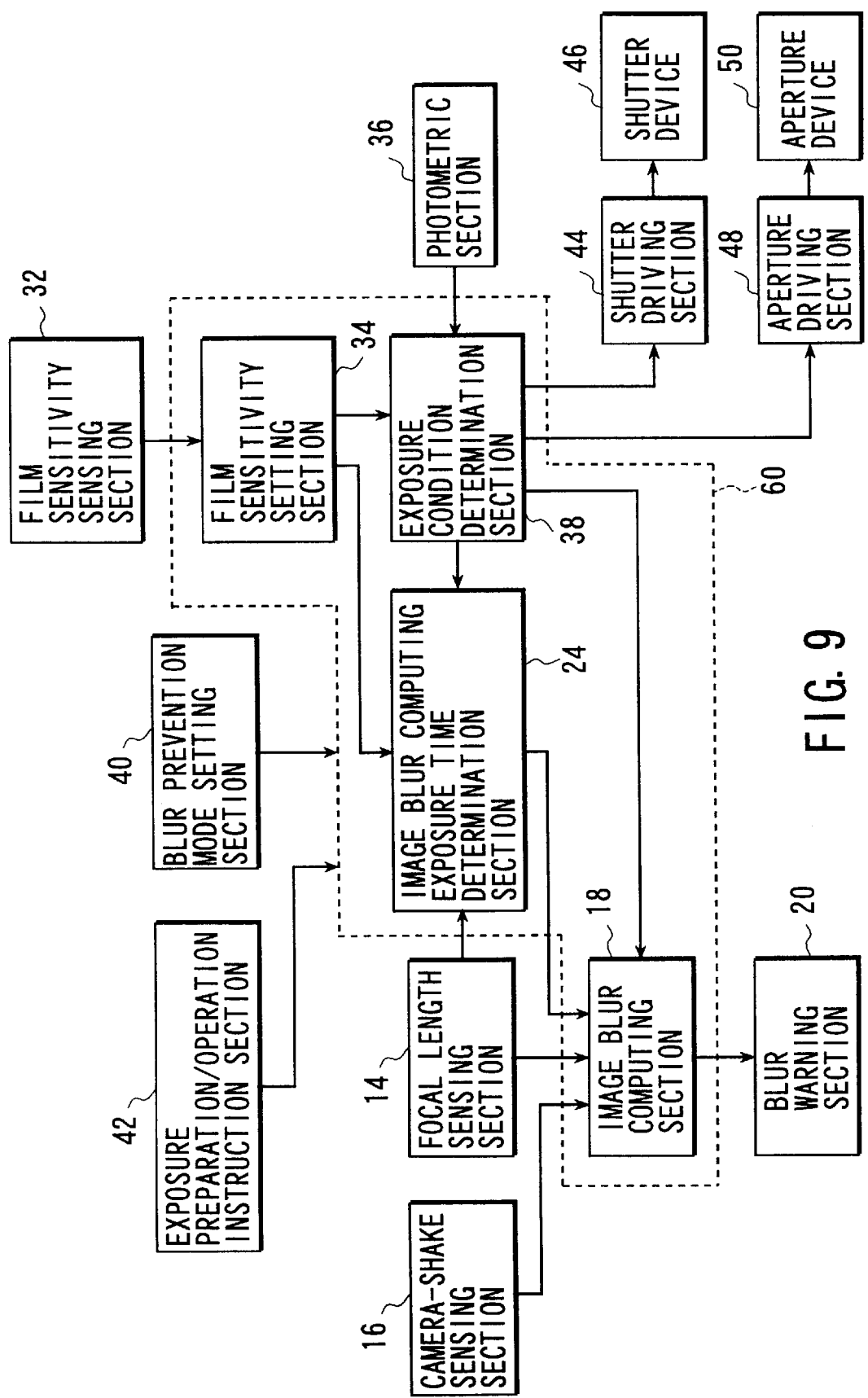
FIG. 9 is a block diagram showing a camera with a blur warning function according to a third embodiment of the present invention.

FIG. 9 is a block diagram illustrating the constitution of a camera with a blur warning function according to the third embodiment of the present invention.

As illustrated in FIG. 9, the outputs of a focal length sensing section 14, a film sensitivity sensing section 32 and an exposure condition determination section 38 are supplied to an image blur computing exposure time determination section 24. The section 24, image blur computing section 18, a film sensitivity setting section 34 and section 38 constitute a camera control section 60. Since the other constitution is the same as that of the second embodiment shown in FIG. 4, its description is omitted.

In the above-described constitution shown in FIG. 9, when the film sensitivity sensing section 32 senses that no film is loaded into the camera, predetermined film sensitivity information such as ISO 3200 is set in the film sensitivity setting section 34. Then the exposure condition determination section 38 determines exposure time and aperture value in accordance with the ISO information and the photometric result of the photometric section 36.

If the blur prevention mode setting section 40 sets a blur prevention mode as a shooting mode, the camera control section 60 receives it, and the image blur computing exposure time determination section 22 sets image blur computing exposure time. This determination depends on the focal length information sensed by the focal length sensing section 14 or the relationship between the focal length information and the exposure time information determined by the exposure condition determination section 24.

Figure 10:
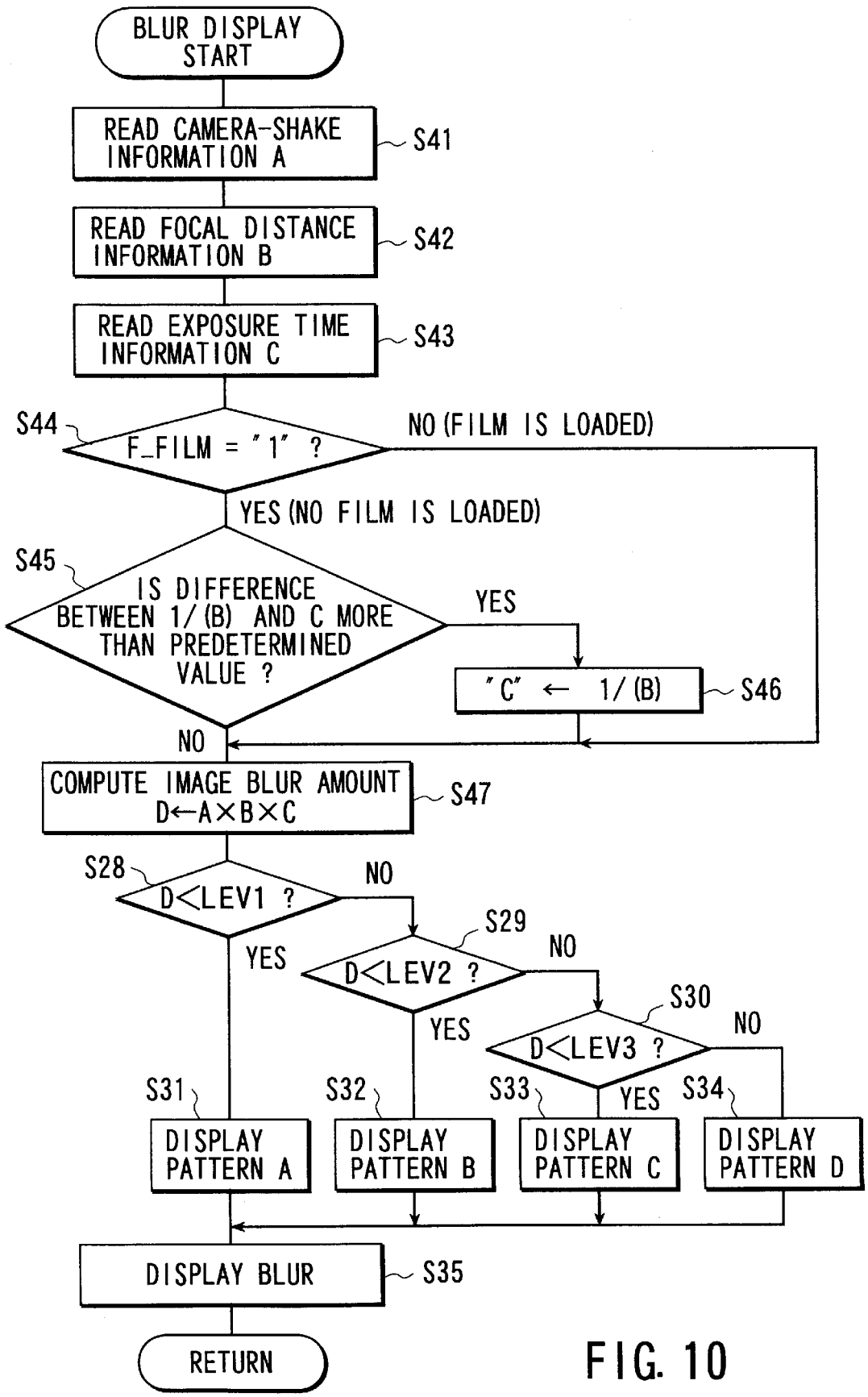
FIG. 10 is a flowchart for explaining an operation of subroutine "BLUR DISPLAY" in the camera shown in FIG. 9.
Figure 11:
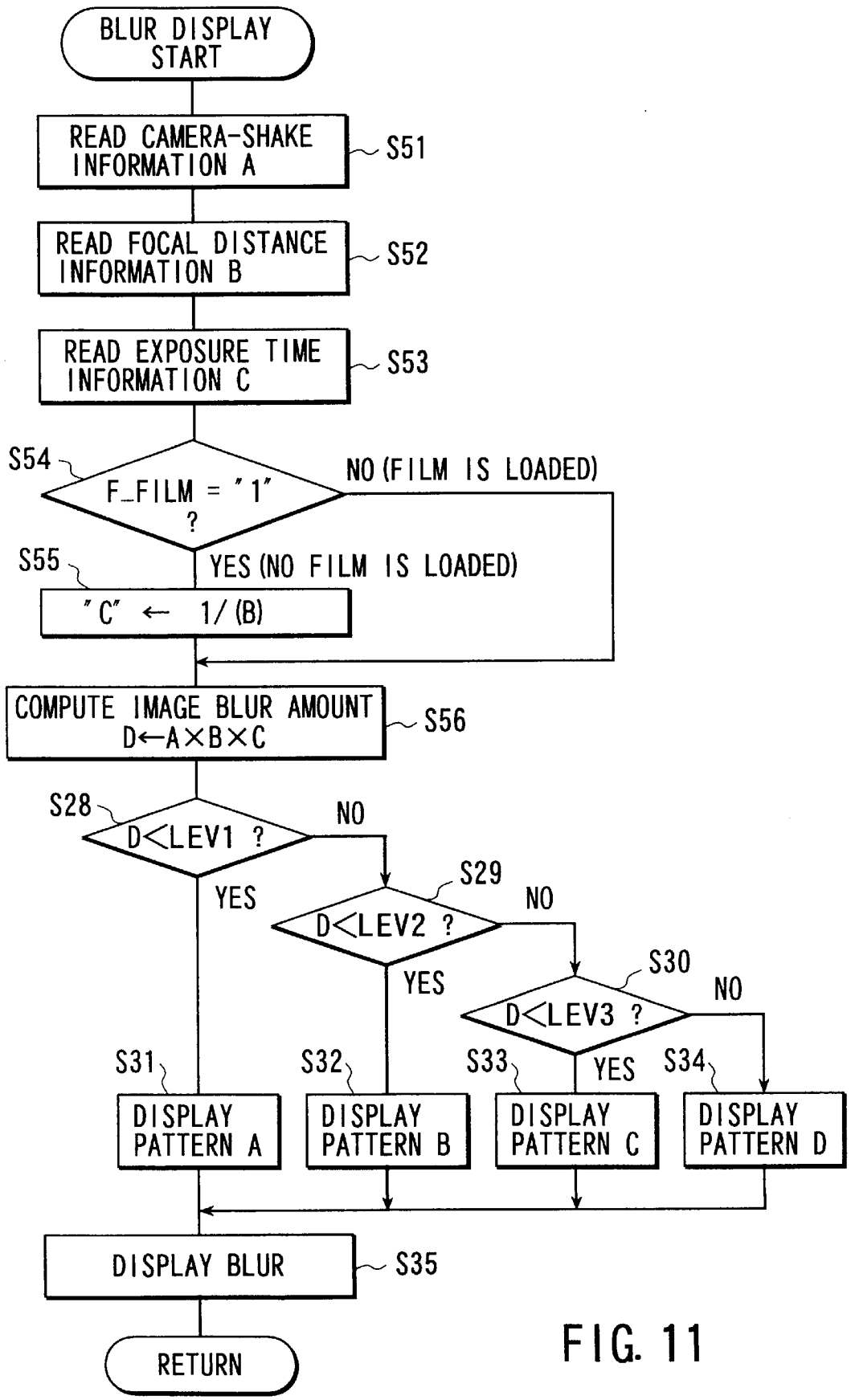
FIG. 11 is a flowchart for explaining an operation of a modification to the camera shown in FIG. 9.

A specific method of determining the image blur computing exposure time will be described later with reference to the flowcharts shown in FIGS. 10 and 11.

If an exposure preparation/operation instruction section 42 performs an exposure preparation instruction operation (the first release is switched on), the image blur computing section 18 computes an image blur state (level). This computation is performed based on camera shake information sensed by a camera shake sensing section 16, focal length information sensed by the focal length sensing section 14, and exposure time information determined by the image blur computing exposure time determination section 24. In accordance with the result of the image blur computing section 18, a blur warning section 20 displays an image blur state (level).

An operation of subroutine "BLUR DISPLAY" in the third embodiment will now be described with reference to the flowchart of FIG. 10.

First, in step S41, camera shake information A sensed by the camera shake sensing section 16, is read out. Then, in step S42, focal length information B sensed by the focal length sensing section 14, is read out and, in step S43, exposure time information C determined by the exposure condition determination section 38, is read out.

In step S44, it is determined whether the film loading state flag F_FILM is "1" or not. When the flag is "1" (no film is loaded), the flow advances to step S45. When the film flag F_FILM is "0" (a film is loaded), the flow goes to step S47.

In step S45, it is determined whether a relationship between the time (i.e., 1/focal length) corresponding to an inverse number of focal length information B read out in step S42 and exposure time information C read out in step S43 is more than a predetermined value or specifically whether exposure time (C) is shorter than 1/B by not less than a predetermined value. When a difference between 1/B and C is less than a predetermined value, the flow moves to step S47. When it is not less than the predetermined value, the flow advances to step S46. In step S46, 1/B is replaced with exposure time information C as it is. Then, the flow goes to step S47.

In step S47, an image blur amount D is computed. This computation is basically executed according to the following equation (3):

$$D = A \times B \times C \qquad (3)$$

where D is an image blur amount, A is a camera shake speed, B is a focal length, and C is exposure time. The camera shake speed is fixed within the exposure time.

When no film is loaded into the camera and the exposure time (C) is shorter than the time corresponding to 1/focal length by not less than a predetermined value, the exposure time for computing the image blur amount D is changed from C to 1/B. Even though no film is loaded into the camera, a blur level is displayed when the camera is actually used (1/focal length). It is thus possible to display an image blur state (level) with the feeling of use of the camera which is not so different from usual.

The processing after step S47 is identical with that of the above flowchart shown in FIG. 6 and thus the descriptions of the steps with the same numbers are omitted.

An operation of a modification to the third embodiment will now be described with reference to the flowchart of FIG. 11.

First, in step S51, camera shake information A sensed by the camera shake sensing section 16, is read out. Then, in step S52, focal length information B sensed by the focal length sensing section 14, is read out and, in step S53, exposure time information C determined by the exposure condition determination section 38, is read out.

In step S54, it is determined whether the film loading state flag F_FILM is "1" or not. When the flag is "1" (no film is loaded), the flow advances to step S55. When the film flag F_FILM is "0" (a film is loaded), the flow goes to step S56.

In step S55, the time corresponding to an inverse number of focal length information B read out in step S42, that is, 1/focal length is replaced with exposure time information C as it is. Then, the flow moves to step S56.

In step S56, an image blur amount D is computed.

This computation is basically executed according to the following equation (4):

$$D = A \times B \times C \qquad (4)$$

where D is an image blur amount, A is a camera shake speed, B is a focal length, and C is exposure time. The camera shake speed is fixed within the exposure time.

When no film is loaded into the camera, the exposure time for computing the image blur amount D is changed from exposure time information C to time of "1/focal length." Even though no film is loaded into the camera, a blur level is displayed when the camera is actually used (1/focal length). It is thus possible to display an image blur state (level) with the feeling of use of the camera which is not so different from usual.

The processing after step S56 is identical with that of the above flowchart shown in FIG. 6 and thus the descriptions of the steps with the same numbers are omitted.

A fourth embodiment of the present invention will now be described.

Figure 12:
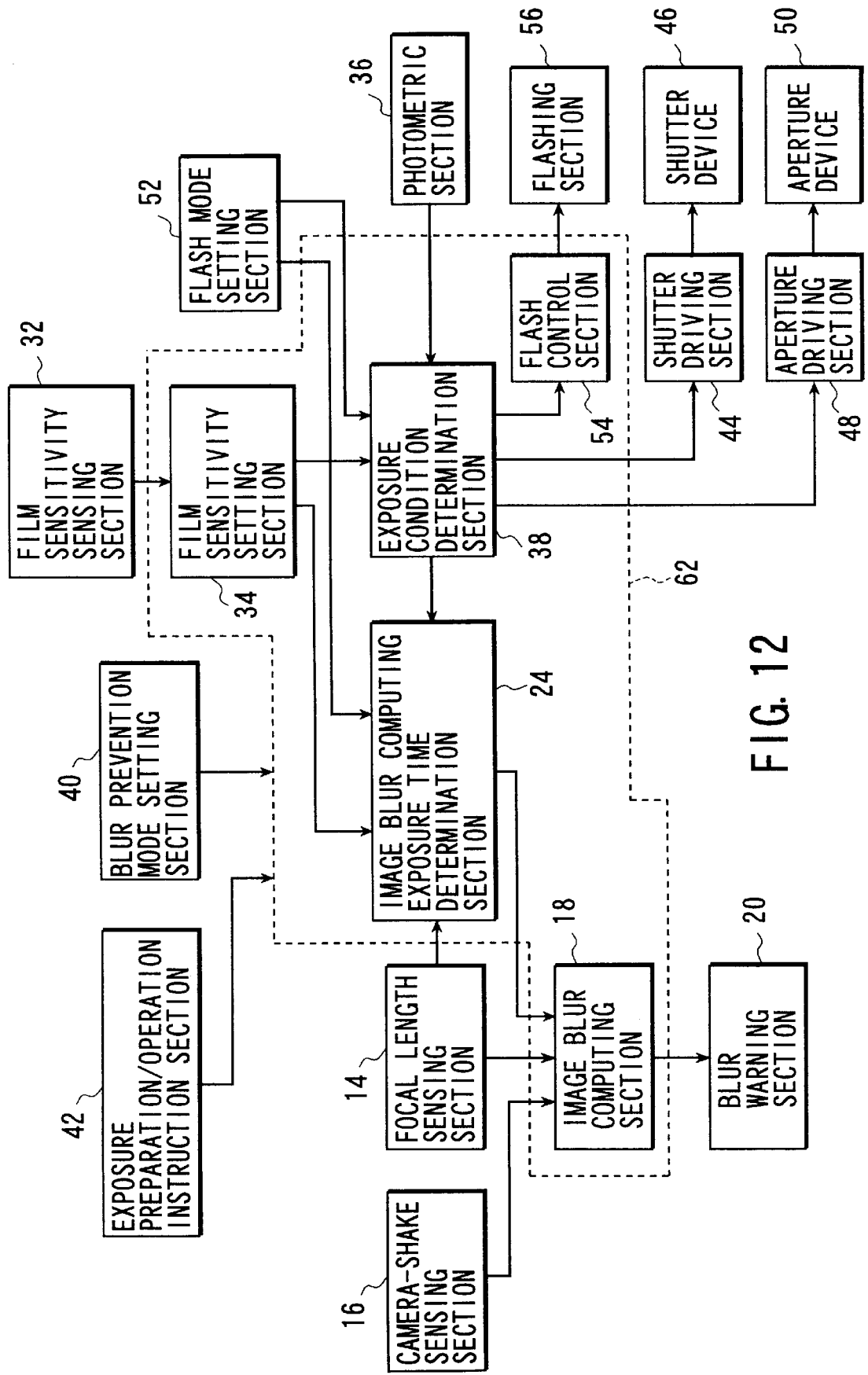
FIG. 12 is a block diagram showing a camera with a blur warning function according to a fourth embodiment of the present invention.

FIG. 12 is a block diagram illustrating the constitution of a camera with a blur warning function according to the fourth embodiment of the present invention.

The camera illustrated in FIG. 12 differs from that shown in FIG. 9 in addition of a flash mode setting section 52, a flash control section 54 and a flashing section 56.

The camera of the fourth embodiment is the same as that of the third embodiment in basic operation. In addition to the third embodiment, when a user selects a mode capable of a flash using the flash mode setting section 52 and the flash mode setting section 52 determines that a flash should be emitted in dark conditions, flashing time (e.g., 1/60 SEC) is set to the actual exposure time.

The flashing time is also applied to the image blur computing exposure time determined by the image blur computing exposure time determination section 24.

The other constituents are the same as those of the third embodiment as shown in FIG. 9.

Figure 13:
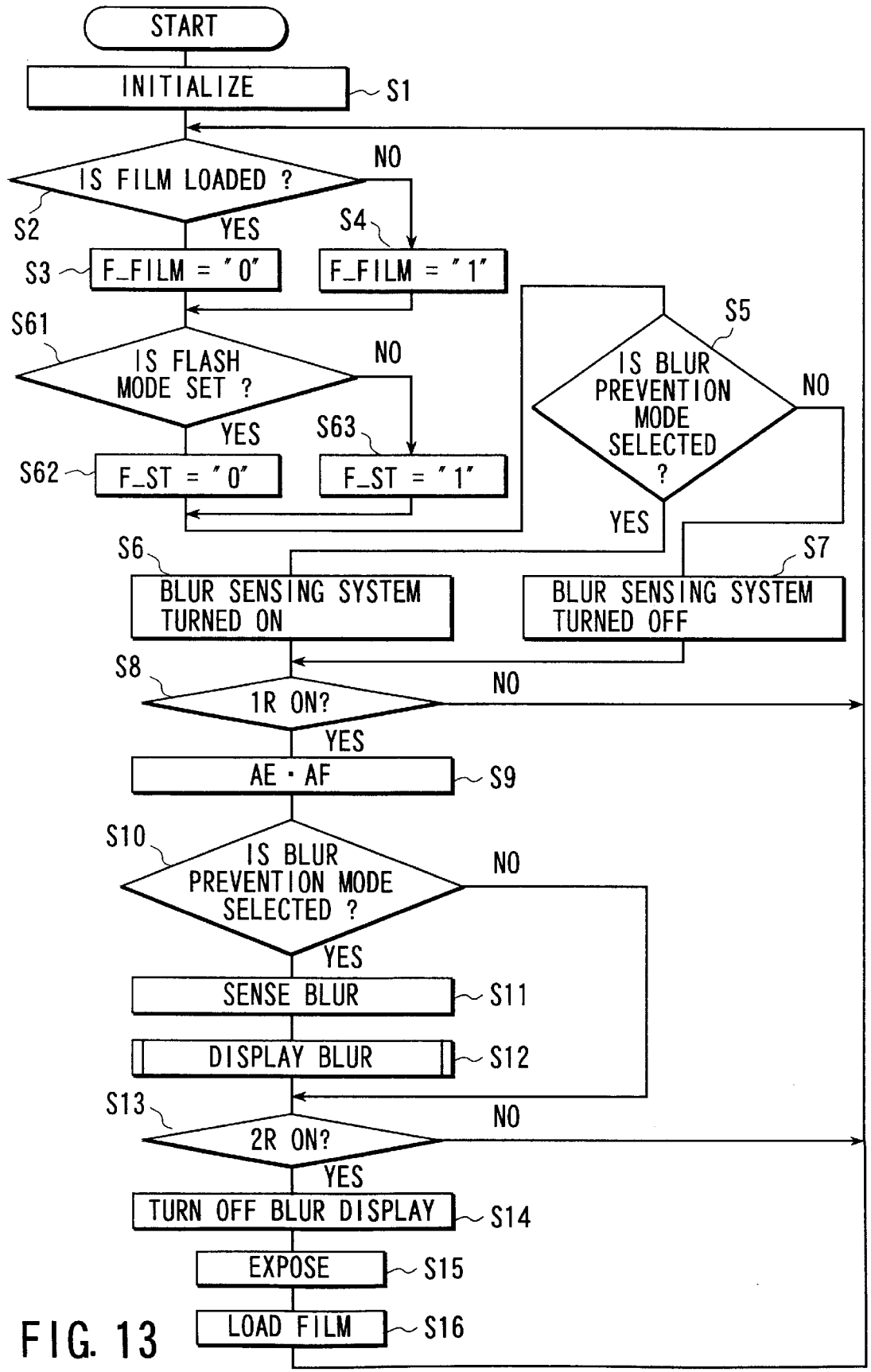
FIG. 13 is a flowchart for explaining the general outline of an operation of the camera shown in FIG. 12.

The general outline of an operation of the camera according to the fourth embodiment will now be described with reference to the flowchart of FIG. 13.

First, in step S1, initialization is performed and then, in step S2, it is determined whether a film is loaded into a camera or not. In accordance with the film loading state, the flow advances to step S3 or S4, and a film loading state flag F_FILM is set to "0"or "1."

In step S61, it is determined whether a flash mode is set. This determination is done by operating the flash mode setting section 52.

If it is determined that the mode is set, the flow moves to step S62 and a flash setting flag F_ST is set to "0." On the other hand, if it is determined that the mode is not set, the flow goes to step S63 and F_ST is set to "1." After that, the flow advances to step S5. Since the processing after step S5 is identical with that of the above flowchart shown in FIG. 5, the descriptions of the steps with the same numbers are omitted.

Figure 14:
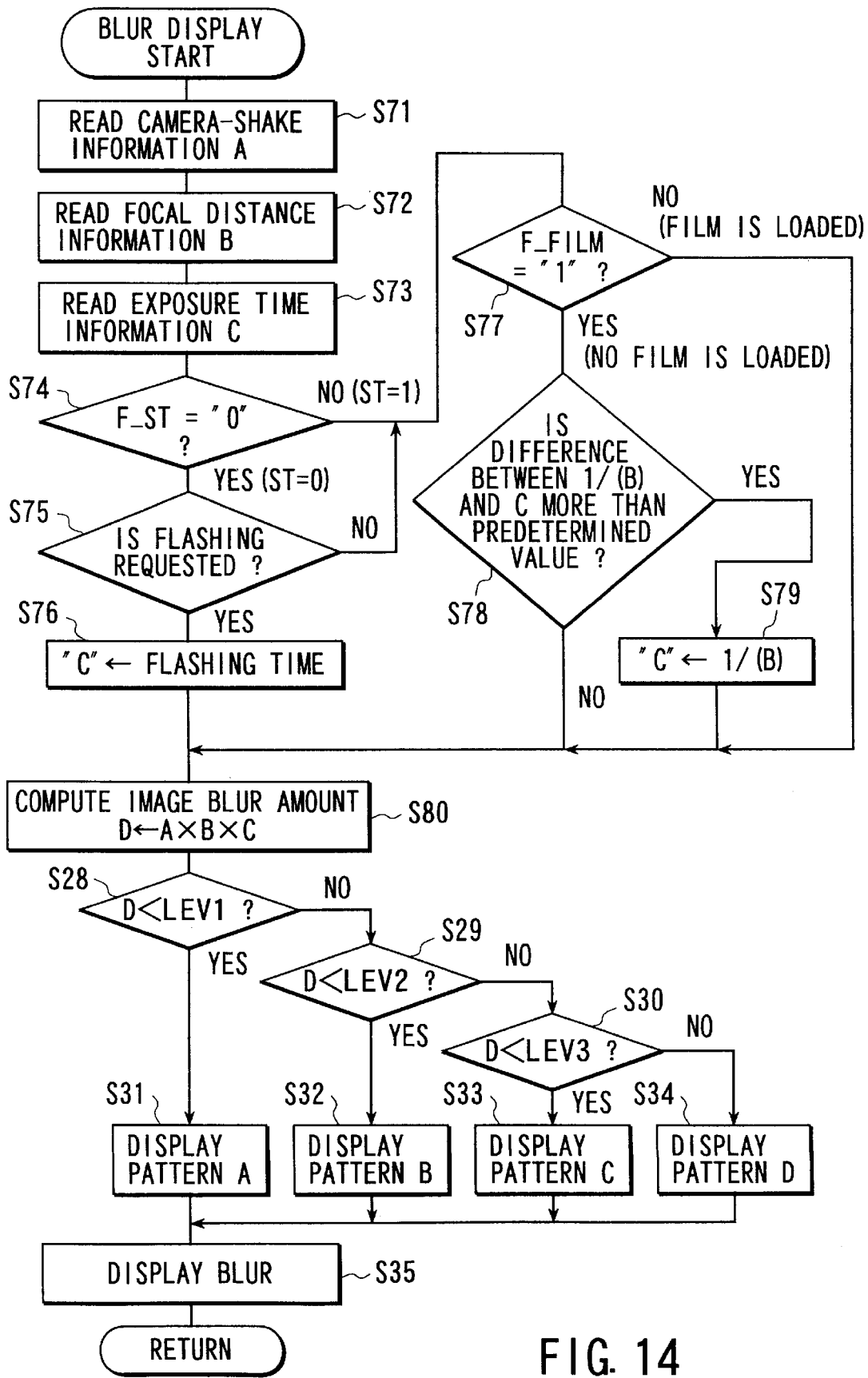
FIG. 14 is a flowchart for explaining an operation of subroutine "BLUR DISPLAY" in the camera shown in FIG. 12.

An operation of subroutine "BLUR DISPLAY" in the fourth embodiment will now be described with reference to the flowchart of FIG. 14.

First, in step S71, camera shake information A sensed by the camera shake sensing section 16, is read out. Then, in step S72, focal length information B sensed by the focal length sensing section 14, is read out and, in step S73, exposure time information C determined by the exposure condition determination section 38, is read out.

In step S74, it is determined whether the flash setting flag F_ST is set to "0" or not. If the flag is "0" (flash mode is set), the flow advances to step S75. If the flag is "1" (flash mode is not set), the flow moves to step S77.

In step S75, it is determined whether a flash is actually requested or not. This determination is done by the exposure condition determination section 38 based on the current luminance information, film sensitivity information, etc. If a flash is requested, the flow moves to step S76. If not, the flow advances to step S77.

In step S76, a user sets a flash mode, and the exposure time information C of a blur level computing amount is replaced with flashing time, e.g., 1/60 [SEC]. After that, the flow goes to step S79.

In step S77, it is determined whether the film loading state flag F FILM is "1" or not. When the flag is "1" (no film is loaded), the flow advances to step S79. When it is "0" (a film is loaded), the flow goes to step S78.

In step S78, exposure time information for computing an image blur amount is set after it is determined that no film is loaded. More specifically, it is determined whether the relationship between the time corresponding to an inverse number of focal length information B read out in step S72 (1/focal length) and exposure time information C read out in step S73 is more than a predetermined value. If a difference between 1/B and C is less than a predetermined value, the flow moves to step S27. If it is not less than the value, the flow goes to step S79. In step S79, the time 1/B (1/focal length) is replaced with exposure time information C. After that the flow goes to step S80.

In step S80, an image blur amount D is computed.

This computation is basically executed according to the following equation (5):

$$D = A \times B \times C \quad (5)$$

where D is an image blur amount, A is a camera shake speed, B is a focal length, and C is exposure time. The camera shake speed is fixed within the exposure time.

The exposure time C used for computing the image blur amount D is set according to whether a flash is emitted or not and whether a film is loaded or not as described above. Even though a flash is emitted and no film is loaded, an image blur state (level) can be displayed with the feeling of use of the camera which is not so different from usual.

The processing after step S80 is identical with that of the above flowchart shown in FIG. 6 and thus the descriptions of the steps with the same numbers are omitted.

Figure 15:
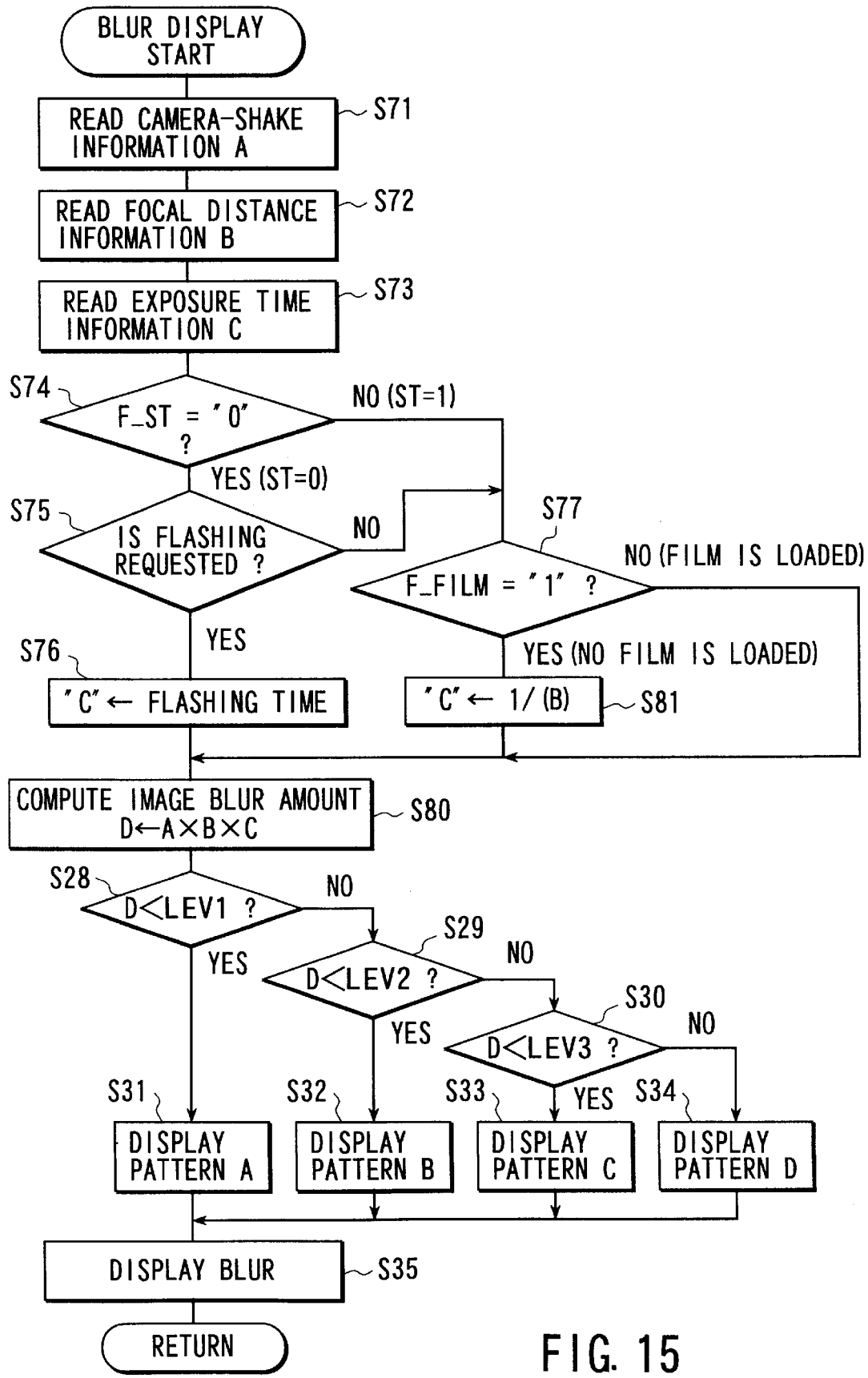
FIG. 15 is a flowchart for explaining an operation of a modification to the camera shown in FIG. 12.

An operation of a modification to the fourth embodiment will now be described with reference to the flowchart of FIG. 15.

In step S77, it is determined whether the film loading state flag F_FILM is "1" or not. When the flag is "1" (no film is loaded), the flow advances to step S79. When it is "0" (a film is loaded), the flow goes to step S78.

In step S81, time 1/B (1/focal length) is replaced with exposure time information C as it is. After that, the flow moves to step S80.

Since the processing after steps S71 to S77 and step S80 is identical with that of the above flowchart shown in FIG. 6, the descriptions of t he steps with the same numbers are omitted.

According to the present invention described above, there can be provided a camera with a blur warning function which does not widely vary in feeling of use between film-loading and film-unloading.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera with a blur warning function, comprising:
   a film loading sensing section for sensing whether or not a film is loaded;
   a camera shake sensing section for sensing a camera shake;
   an image blur computing section for computing a blur amount
   an image blur computing section for computing a blur amount of an image formed on an image forming surface in response to an output of the camera shake sensing section; and
   a blur warning section for giving a warning of a blur in accordance with a computation result of the image blur computing section;
   wherein the image blur computing section changes the computation result in accordance with a detection result of the film loading sensing section; and
   wherein the camera further comprises a focal length sensing section for sensing a focal length of a lens, and the image blur computing section computes the blur amount of the image formed on the image forming surface in response to an output of the focal length sensing section and the output of the camera shake sensing section based on the detection result of the film loading sensing section.

2. The camera according to claim 1, wherein the image blur computing section changes the computation result when the film loading sensing section senses that the film is not loaded.

3. A camera with a blur warning function, comprising:
   a film loading sensing section for sensing whether or not a film is loaded;
   a camera shake sensing section for sensing a camera shake;
   a blur computing coefficient determination section for determining a predetermined blur computing coefficient in accordance with a detection result of the film loading section;
   an image blur computing section for computing a blur amount of an image formed on an image forming surface in response to an output of the camera shake sensing section and the blur computing coefficient; and
   a blur warning section for giving a warning of a blur in accordance with a computation result of the image blur computing section;
   wherein the camera further comprises a focal length sensing section for sensing a focal length of a lens, and the image blur computing section computes the blur amount of the image formed on the image forming surface in response to an output of the focal length sensing section, the output of the camera shake sensing section, and the blur computing coefficient.

4. The camera according to claim 3, wherein the blur computing coefficient determined by the blur computing coefficient determination section is larger when the film is not loaded as compared to when the film is loaded.

5. A camera with a blur warning function, comprising:
   a film loading sensing section for sensing whether or not a film is loaded;
   a camera shake sensing section for sensing a camera shake;
   an image blur computing exposure time determination section for determining computing exposure time information in accordance with a detection result of the film loading sensing section;
   an image blur computing section for computing a blur amount of an image formed on an image forming surface in response to an output of the camera shake sensing section and the blur computing exposure time information; and
   a blur warning section for giving a warning of a blur in accordance with a computation result of the image blur computing section;
   wherein the camera further comprises a focal length sensing section for sensing a focal length of a lens, and the image blur computing section computes the blur amount of the image formed on the image forming surface in response to an output of the focal length sensing section, the output of the camera shake sensing section, and the computing exposure time information.

6. A camera with a blur warning function, comprising:

a film loading sensing section for sensing whether or not a film is loaded;

a camera shake sensing section for sensing a camera shake;

an image blur computing exposure time determination section for determining computing exposure time information in accordance with a detection result of the film loading sensing section;

an image blur computing section for computing a blur amount of an image formed on an image forming surface in response to an output of the camera shake sensing section and the blur computing exposure time information; and a blur warning section for giving a warning of a blur in accordance with a computation result of the image blur computing section;

wherein the camera further comprises a focal length sensing section for sensing a focal length of a lens, and the image blur computing exposure time determination section determines the computing exposure time in accordance with the focal length when the film loading sensing section senses that the film is not loaded.

7. A camera, with a blur warning function, comprising:

a film loading sensing section for sensing whether or not a film is loaded;

a camera shake sensing section for sensing a camera shake;

an image blur computing exposure time determination section for determining computing exposure time information in accordance with a detection result of the film loading sensing section;

an image blur computing section for computing a blur amount of an image formed on an image forming surface in response to an output of the camera shake sensing section and the blur computing exposure time information; and a blur warning section for giving a warning of a blur in accordance with a computation result of the image blur computing section;

wherein the camera further comprises a flash emitting section for emitting a flash, and the computing exposure time information corresponds to flashing time when the flash emitting section emits a flash.

8. A camera with a blur warning function, comprising:

a flash emitting section capable of emitting a flash;

an exposure condition determination section for determining whether a flash is emitted or not;

a camera shake sensing section for sensing a camera shake;

an image blur computing exposure time determination section for determining computing exposure time information in response to an output of the exposure condition determination section;

an image blur computing section for computing a blur amount of an image formed on an image forming surface in response to an output of the camera shake sensing section and the computing exposure time information; and a blur warning section for giving a warning of a blur in accordance with a computation result of the image blur computing section.

9. The camera according to claim 8, wherein the computing exposure time information corresponds to flashing time when the exposure condition determination section determines that a flash is emitted.

* * * * *